United States Patent [19]

Irwin et al.

[11] 3,760,375

[45] Sept. 18, 1973

[54] SOURCE DATA ENTRY TERMINAL

[75] Inventors: Samuel N. Irwin; Michael R. Levine, both of Ann Arbor, Mich.

[73] Assignee: Sycor, Inc., Ann Arbor, Mich.

[22] Filed: July 26, 1971

[21] Appl. No.: 166,269

Related U.S. Application Data

[63] Continuation of Ser. No. 833,898, June 13, 1969, abandoned.

[52] U.S. Cl. .......... 340/172.5
[51] Int. Cl. .......... G06f 3/06
[58] Field of Search .......... 340/172.5

[56] References Cited

UNITED STATES PATENTS

| | | | |
|---|---|---|---|
| 3,389,404 | 6/1968 | Koster | 340/172.5 |
| 3,400,371 | 9/1968 | Amdahl et al. | 340/172.5 |

*Primary Examiner*—Paul J. Henon
*Assistant Examiner*—John P. Vandenburg
*Attorney*—Price, Heneveld, Huizenga and Cooper

[57] ABSTRACT

A source data entry device having a keyboard for data entry, a cathode ray tube for visual display of key-entered data, and magnetic recorders for storing entered data upon cassette-type magnetic tape cartridges, wherein control logic for the keyboard, visual display, recorders, and other input/output peripheral devices is centralized into a central logic unit, and wherein program-controlled data entry is made possible by a wired read-only memory which, in conjunction with the central logic unit, forms a programmed microprocessor whose functional configuration can be altered by changing the hardwired read-only memory.

46 Claims, 4 Drawing Figures

INVENTORS
SAMUEL N. IRWIN
MICHAEL R. LEVINE
BY Price, Heneveld
Huizenga & Cooper
ATTORNEYS INVENTORS
SAMUEL N. IRWIN
MICHAEL R. LEVINE
BY Price, Heneveld, Huizenga & Cooper
ATTORNEYS

SOURCE DATA ENTRY TERMINAL

This is a continuation of application Ser. No. 833,898, filed on June 13, 1969, and now abandoned.

BACKGROUND

The continued and active development of ever-improved computer hardware and associated peripheral devices which has taken place in the present era has continuously improved the efficiency of data processing per se; however, the aspect of effective and efficient data capture and input to the computer itself has always been a problem of significance, and this problem has become greatly enlarged by the ever-increasing improvement and sophistication of computers themselves.

In previous times, the key punch was almost the exclusive instrument of source data preparation and computer input of the same, with upwards of a half-million such devices operating daily in the field. That the key punch, as well as the punched card produced thereby, has limitations and disadvantages, even as a form of data handling, is scarcely debatable at the present time. Many efforts have been made to provide different types of devices which would accomplish source data capture and input in different ways, and which would hopefully be more advantageous and more effective than punched cards.

One development in the way of an input device has been the on-line video terminal, in which a remote location communicates with a computer at a central location through a telephone or telegraph link. In such a system, data is entered from the remote location by an operator there who uses a keyboard on the terminal device, with the data which is transmitted being visually displayed on a cathode ray tube to the operator as she types on the keyboard. Such terminals are basically quite effective devices, but they are relatively inefficient with respect to on-line computer time, as well as communication link usage time. More recent development has produced the concept of an off-line data entry terminal in which data from a source document or the like is entered by an operator through the use of a keyboard and captured by being recorded on tape. Such a device is extremely effective, since the operator may take whatever time is necessary to capture the data on tape, whereas access time to a central processing unit is drastically diminished, since it is only necessary to replay the tape over the communications link. Furthermore, relatively low-cost storage per record is provided, and the terminals are very quiet compared to normal key punch clatter.

THE PRESENT INVENTION

The present invention provides a keyboard-to-tape data terminal based on a new design concept, by which significant advantages are made obtainable. Firstly, it is an objective of the invention to provide a keyboard-to-tape source data entry terminal with video display, in which the data is uniquely captured on magnetic tape cassettes of the general type presently finding extensive and widespread usage in audio entertainment equipment but never heretofore used in data-handling apparatus, for the off-line capture and preparation of data for purposes of computer input and also for easy and inexpensive storage of any desired duration.

Further, it is a major objective of the invention to provide a self-contained, stand-alone, programmed video terminal which incorporates a microprocessor for program-controlled data entry and preparation and for the possibility of having at least limited computer capabilities, including arithmetic routines and the like, at the data source. Involved in this major objective is the provision of a microprocessor in such a data entry terminal which incorporates a central logic unit which incorporates all (or substantially all) control logic for the various input/output elements of the terminal, i.e., keyboard, video display, tape recorder, and the like, as well as a wired read-only memory containing a hardwired program designed for a particular functional application and dedicating the terminal to that application, wherein the enter purpose and operation of the machine can be completely revised merely by substitution of a different read-only memory configuration, containing a different hardwired program dedicating the terminal to a different function, without the necessity of redesigning or modifying the operational and control logic.

Thus, the hardwired read-only memory and the centralized logic unit of the present design form a small but nonetheless powerful microprocessor providing an extremely flexible and wide-scale scope of operation for a data entry terminal having all of the needed operational functions ancillary to source data preparation, including either programmed or free-form data entry, verification, correction, recording, search, edit, and display. Pooling and selective data transfer is made possible by the provision of a second cassette recorder which, when not in active use, may be used for resident storage of data entry format programs.

Briefly stated, the data entry terminal of the invention therefore comprises a programmed microprocessor incorporating a wired read-only memory and central logic unit, a keyboard having alpha, numeric, punctuation, and special symbol keys for providing a bit-coded input to the microprocessor, a buffer or intermediate memory for temporary storage of both programs and data which has been entered from the keyboard, a CRT display for visually reading out data or program information from the buffer memory and, in a preferred embodiment, at least one magnetic tape cassette recorder, on which data from the buffer memory may be recorded. A number of peripheral devices may be interfaced to this basic terminal configuration where desired, including for example a printer, a communications link coupled to other like entry terminals or to a shared central processor unit, a converter for conversion of the data recorded on the cassettes to computer-compatible tapes, and the like. Generally, the provision of the magnetic tape cassette recorder will be desired; it is to be noted, however, that in certain functional operational configurations, this is not a strict necessity and the required data storage may be adequately furnished by the buffer memory, in an interconnected system of independent but mutually cooperative data entry sources.

IN THE DRAWINGS

PREFERRED EMBODIMENT

Figure 1:
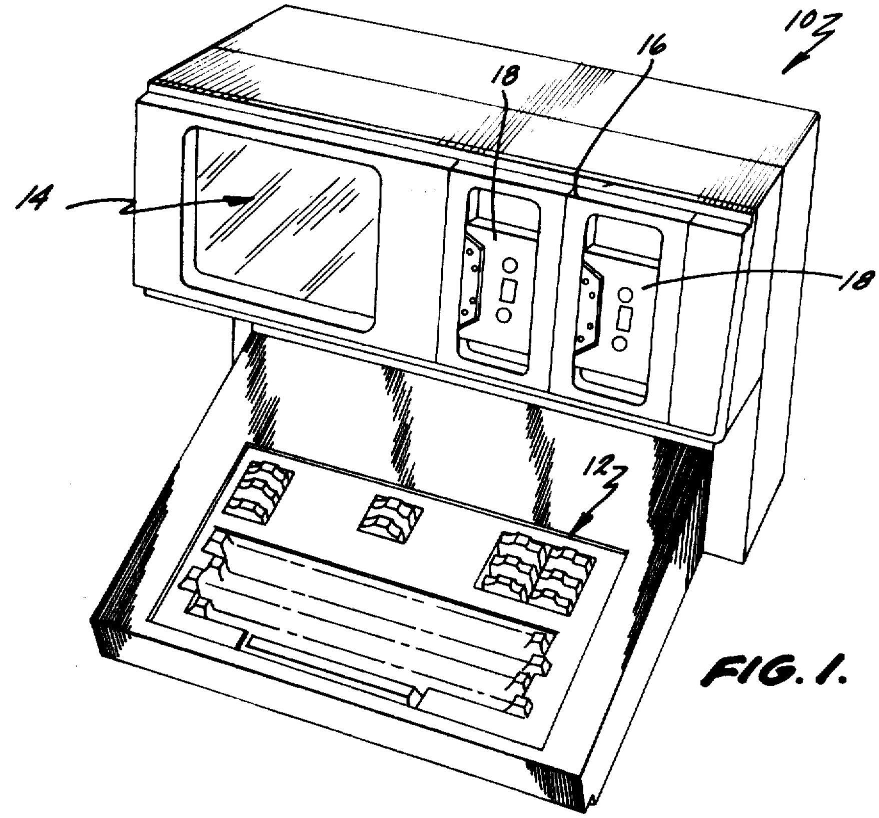
FIG. 1 is a frontal perspective view showing the overall outward appearance of the preferred data entry terminal.

A preferred physical embodiment of the data entry terminal 10 of the invention is illustrated in FIG. 1, from which it may be seen that the device preferably comprises a self-powered desk-top unit having a readily accessible keyboard portion 12, a CRT display 14 providing a visual readout of entered data, and a recorder section 16 which operates to record the data entered from the keyboard, in the form of bit-coded records, on magnetic tape enclosed within cartridges or magazines 18 of the type known generally as "cassettes". As indicated, the recorder 16 may be duplicate in form, providing a pair of available cassettes 18 which may be used in a selective manner. As will be seen, the cassettes 18 may be used for program or data-entry format material as well as for the recording of data. As illustrated, the keyboard portion 12 has different groupings of keys, which should include 26 alpha characters, 10 numeric characters, eight punctuation characters, and 18 special symbol characters for machine control and operation, with each different set of keys preferably arranged in its own individual grouping.

Figure 4:
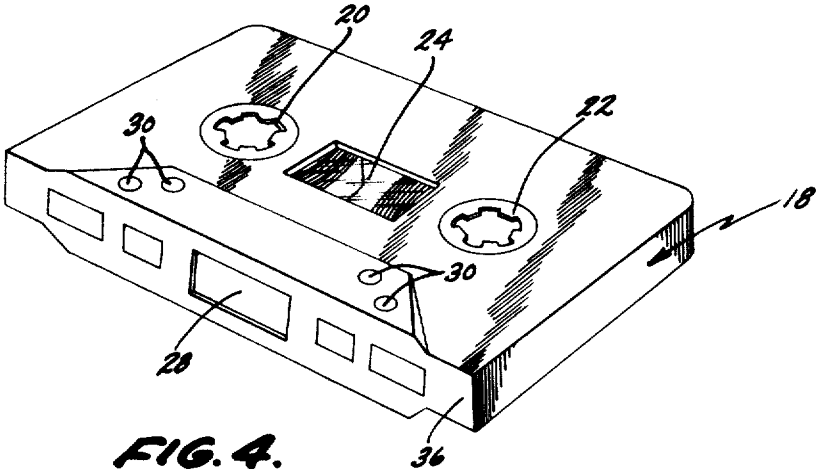
FIG. 4 is a perspective view of the magnetic tape cassette used in the embodiment of the entry terminal having recording capabilities.

The tape cassettes 18 are illustrated in more detail in FIG. 4, from which it will be apparent that these components are of the type which are almost universally available for audio purposes, comprising a flat, compact, basically rectangular case or housing (conventionally of plastic) enclosing several hundred feet of magnetic recording tape which is nominally 0.15 inches wide. The ends of the tape are secured to internal winding spool elements which are accessible from outside the cassette by takeup sprockets 20, 22. Normally, a transparent inspection window 24 is provided in both of the opposite sides of the cassette, for visual inspection of the amount of tape wound upon one or the other of the internal spools. The tape within the cassette is suitably guided toward and along the inner side of a front face 26 of the cassette, comprising one edge of it. A series of openings 28 are formed along this face or edge for direct access to the tape by a tape head, tape guides, and like elements. Also, a series of apertures 30 are provided in each of the opposite top and bottom sides of the cassette, primarily intended for receiving mounting pins and a drive capstan.

Figure 2:
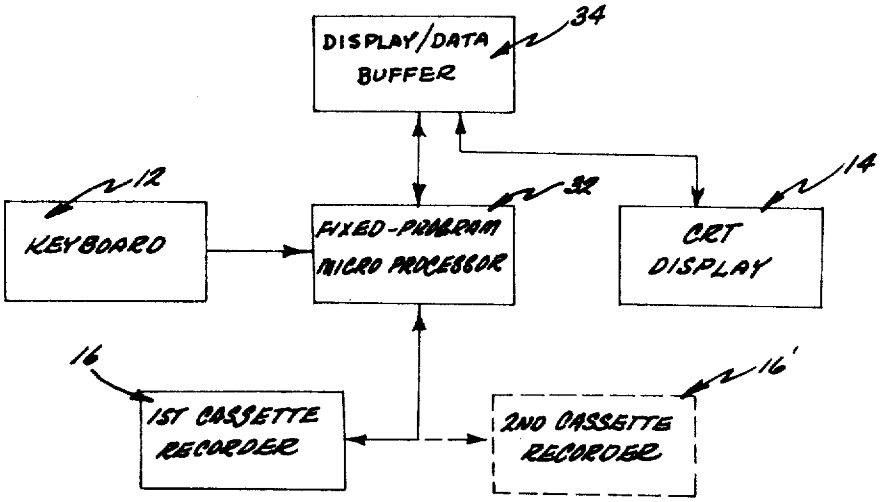
FIG. 2 is a simplified schematic diagram in block form, showing the basic organization of the device.

The system organization of the present terminal device is illustrated in a general way in FIG. 2, from which it will be seen that the keyboard 12, the cassette recorder 16 (of which there may be a second recorder 16' providing the selective two-cassette operation noted above) and a buffer memory 34 all interface with a fixed-program microprocessor 32, and the buffer memory 34 interfaces with the CRT display 14. The buffer memory thus can temporarily hold data entered from the keyboard 12 while the same is displayed by the video section 14 and until a complete data record has been entered, at which time the data stored in the buffer may be "dumped" into the cassette recorders and the complete data record "written" (i.e., recorded) on the magnetic tapes within the cassettes.

As indicated in more detail in FIG. 3, the microprocessor 32 includes a central logic unit 36, a wired read-only memory (hereinafter ROM) 38, multiple-register working storage 40, and a number of dedicated latches 42, 43 comprising short-duration read/write ("scratch pad") storage. Each of the input/output components or modules comprising the keyboard 12, recorder/reproducer 16, buffer memory 34, and CRT display 14 (as well as any optional peripheral equipment including a printer 44, a tape converter 46, a communications link 48, and the like) is interfaced to the microprocessor 32 through certain of the dedicated latches 42, 43 and/or dedicated registers of the latter, with which the ROM 38 is also coupled.

It is to be noted that in accordance with the present invention, the input/output modules (including the keyboard, recorder, and video display) need not include individual single-purpose control logic, since the central logic unit 36 may incorporate all control logic for all such input/output modules. For this purpose, the ROM 38 contains an appropriate instruction set for time-sharing the central logic unit with the various different input-output modules to effect the required control. In this respect, the architecture of the present terminal assumes a resemblance to that of a general-purpose computer, even though the purpose of the terminal is for the off-line capture and preparation of source data, primarily for ultimate input to a GP computer. Because of this architectural concept, the hardware and circuitry of the terminal, except for the particular content of the ROM 38, may be substantially identical regardless of the particular functional operation or configuration which the terminal is to incorporate, and this may differ radically from one instance to another. That is, the hardwired program of the ROM dedicates the entire terminal to a given functional configuration, which may be changed simply by substituting a different ROM with a different hardwired content. In this manner, it will be recognized that the device of the invention therefore comprises an individually programmed video terminal based on a design so flexible that a complete change of purpose may be accomplished with considerable facility and without the requirement of redesigning an entire machine organization.

The keyboard 12 should preferably be of the electronic type, with internal coding such that the different keys each produce an eight-bit ground-parallel signal with USASCII-compatible coding. As indicated above, there should be alphabetic keys, numeric keys, punctuation keys, and special symbol keys whose codes determine machine control operation. Also, the keyboard should be such as can be locked out of data-entry operation whenever any of several types of errors are detected by data verification and comparison routines carried out internally. The special symbol or machine control keys on the keyboard should include keys by which "enter", "free-form", and "verify" terminal modes may be initiated, as well as keys which will automatically initiate duplication of corresponding characters from previously-entered records, and keys by which fields within a record may be skipped or zero-filled. Also, there should be keys by which previously-recorded format programs on either of the tape cassettes may be selected, by which a search of records on either of the cassette tapes may be initiated, by which the video display may be controlled (such as screen or line-clearing, cursor positioning, and the like), by which the cassette recorders may be controlled for tape advance, rewind, etc., and other like control functions.

Figure 3:
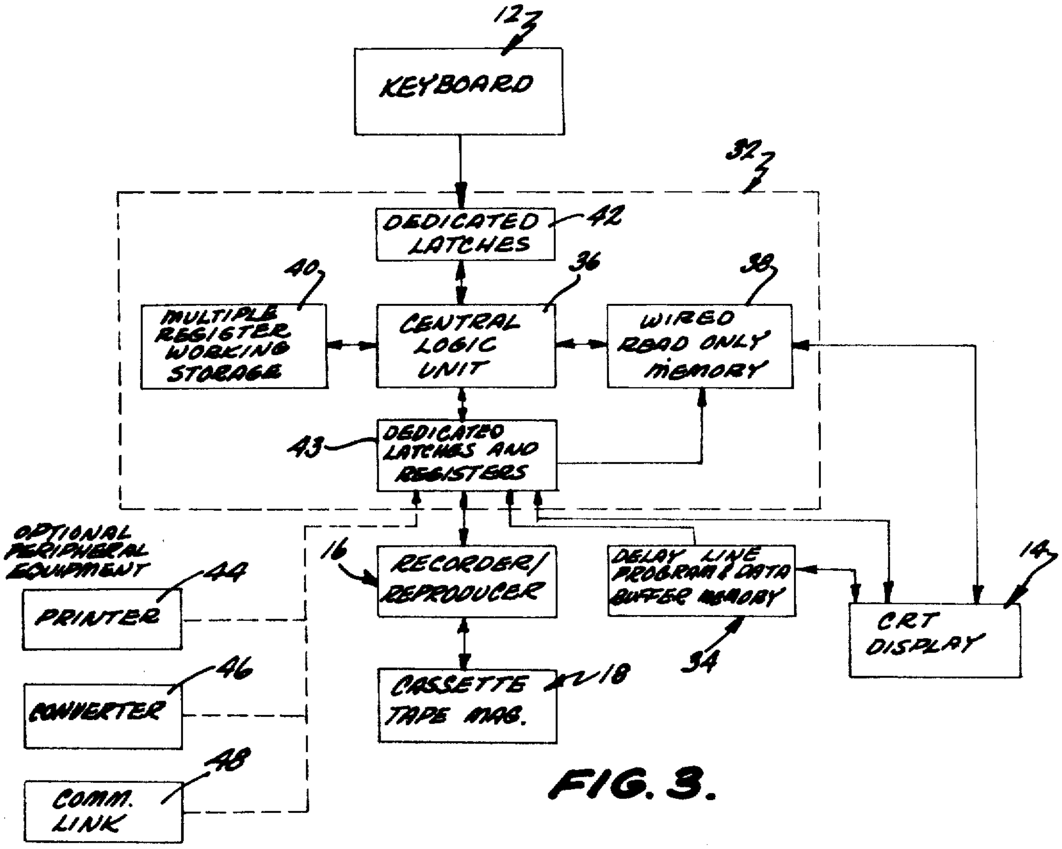
FIG. 3 is a more detailed schematic block diagram of the system, illustrating the makeup of the microprocessor.

As indicated in FIG. 3, the buffer memory 34 is preferably a delay line device which serves as temporary storage for both data-entry format programs and for data entered from the keyboard. In this buffered configuration of the machine, the entered data is held in temporary storage until each particular record is completed, at which time the entire record is recorded on the cassette tape. Actually, the total buffer memory 34 should be comprised of four delay line memories, two of which are dedicated to format program storage, and two of which are dedicated to alternate use in storing data entered from the keyboard of the latter, and one may be dedicated to function as an intermediate buffer between the other, used strictly as a data buffer section, and the cassette recorders.

The data-storage buffer sections just referred to are used as the source of character codes for characters displayed on the CRT, with the USASCII-coded data which is stored in one or the other of the data buffers being read out and used by the microprocessor to cause a character generator for the CRT display to form a character for display each time a key on the keyboard is depressed and the resultant USASCII-coded data produced thereby is stored in the delay line. When a complete record has been entered in a data buffer, the character codes stored in the buffer may be transferred at high speed to the other buffer section, from which the character codes may be recorded on the cassette tape. Alternatively, the record stored in one data buffer may be recorded on the tape directly, with the other buffer being used to store data then being entered from the keyboard during the recording process, with the data and intermediate buffers thus being "flip-flopped", or used interchangeably. In either event, the resulting overlapping operational organization is made desirable by the relatively slow speed at which the tape can be recorded, and a read-after-write data check performed, together with the desirability of being able to continue data entry from the keyboard immediately upon completing the entry of a previous record, and during the time when such previous record is actually being recorded on the tape. Thus, it is desirable that both data buffer sections have sufficient capacity to store an entire data record, so that full overlap may occur.

The two data buffer sections of the delay line memory 34 also may serve valuable functions in a verification mode of the machine, in that data which has been entered by a first key entry operation may be automatically compared with re-keyed verification data, as by comparing the re-keyed data with what should be identical data temporarily stored in one of the data buffers. Also, when a peripheral converter such as that indicated at 46 is used to convert the data serially recorded on the cassette tapes into computer-compatible nine-bit parallel form, the USASCII-coded data read from the cassette tape and stored in one data buffer may be converted to EBCDIC and stored in the other data buffer section. Subsequently, the data from the latter buffer section may be transferred to a computer-compatible tape recorder and there recorded.

The two format program sections of the delay line memory 34 operate in a somewhat analogous manner to the data buffer sections just discussed, except that character codes which are representative of and which initiate machine control functions are entered and stored, rather than data character codes. As has been stated, format programs may be entered initially from the keyboard, in much the same manner as data, although preceded by an appropriate machine mode control code from the keyboard. The internal codes for such program characters are entered into one or the other of the two program storage delay line sections, and may be recorded on the cassette tapes. Also, previously-recorded format programs may be entered directly from the cassette on which they are recorded into delay line program storage, and any format whose program is entered in the delay line may be visually displayed on the CRT. Preferably, such display gives the machine operator visual directions and instructions for proper data entry, and a preferred approach is to display format instructions on the CRT in a line immediately beneath the line on which entered data will be displayed. If the format program includes specific field names and identities, these may be displayed on the second line beneath the current data entry line, with a steady line-by-line succession of data and format material progressing down the face of the CRT display as a data record is progressively entered in accordance with the format program. By way of specific example, it is anticipated that a length of 200 characters for each complete record should be entirely satisfactory. If the internal coding for both instructions and data is for eight-bit characters, then all four sections of the delay line buffer memory should have at least 1600 bit-capacity, and it will be convenient to implement the data buffer sections, as well as the two program storage sections, by 4,000 bit serial-store memories with a clocked output and internal recirculation and using a wiresonic delay line as the storage element.

As indicated previously, the microprocessor 32 includes a multiple register section 40 providing working storage for the device of a strictly temporary and relatively short-term duration, as compared to the delay line buffer memories mentioned previously. As indicated, this working storage is comprised of a plurality of registers (for example, sixteen in number), which should be of eight-bit capacity, and which are interfaced with the central logic unit. The "scratch pad" storage afforded by such multiple registers greatly facilitates and augments the power of the terminal design, and various individual registers (indicated at 43) may be dedicated or assigned particular individual operative functions. For example, one such register may contain the eight least significant bits of the logic unit program counter and thus serve as a program address, while another such register may serve as an accumulator by storing logic unit instructions. Other individual registers may be assigned to real time clocks, both high and low, while still others may be assigned the data buffer memory sections of the delay line memory 34. Other registers in the group 40 may be unassigned, and used for a variety of specific instructions. In addition to the multiple-register working storage 40, the microprocessor organization of the invention also includes the plurality of dedicated latches 42, 43 previously mentioned. These may comprise a total of up to (for example) 256 read/write storage locations, many of which may be utilized for general logic unit functions, while many also are dedicated solely to input/output functions of the keyboard, CRT display, cassette recorder/reproducer, delay line memory, and other similar peripheral modules. In fact, a fundamental and significant part of the concept of the architecture of the present terminal is to have every input/output peripheral device interfaced to the microprocessor through a dedicated latch. As will be understood, the latches will normally be comprised of an arrangement of logic gates serving to provide strictly temporary storage of eight-bit instructions, and as such the latches may be comprised of physically minute integrated circuit packages. The latches are addressed by eight-bit instructions obtained from particular registers in working storage, as by the first three bits of a given instruction; thus, the various registers will load the various latches, and the address of a given latch must therefore be loaded into a given register prior to execution of the instruction containing the address.

The cathode ray tube display 14 provides visual read-out of data entered from the keyboard and held in the data buffer of the delay line memory 34, and it also may be used to visually read out a program format or pattern which has been entered into either of the two program sections of the delay line memory from either the keyboard or from a pre-recorded cassette tape. Also, the CRT display may be used to visually indicate desired information such as the selected mode or status of the machine, as well as to give detected error or verification information. In a terminal device of this type, intended for the capture of source data, it is desirable that the CRT have a display capacity of at least 310 characters, formed in 10 rows of 31 characters each. The particular character set selected is not critical, but a 64 character ISO graphic set is preferred. The character may be generated from a five by seven dot matrix, each dot of which will be selectively blanked or unblanked by a given microprocessor command. The blanking codes for the dot matrix are stored in the read-only memory 38, and these are accessed by the character code sequence contained in the program or data sections of the delay line storage. Display controller means may be used to provide an interface for the cathode ray tube and the delay line memory, to accept from and delivers to the latter, and the ROM, instruction signals pertaining to characters to be displayed, and to process the same to produce the desired dot matrix alphanumeric display.

The cassette recorders, as mentioned previously, comprise essentially operative tape decks designed to accept the cassette magazines and to serially record the USASCII-coded bits transferred from the one or the other of the data buffers. As has been indicated, the control logic for the recorders may be a part of the central logic unit 36, with recorder control achieved from direct keyboard commands, as well as automatically, upon instructions read out of the ROM to the central logic unit during the recording of complete records which have been entered in a data buffer section. As is known, cassette-type tape magazines are commonly available with 280 feet, 420 feet, or 560 feet of relatively narrow (about 0.15 inches) completely-enclosed magnetic recording tape, and the present invention contemplates that the captured data shall be serially recorded on the cassette tape in eight-bit bytes. Recorded bit density may be on the order of 800 bits per inch, and thus even the low-capacity cassettes containing only 280 feet of recording tape have a capacity of on the order of several thousand eight-bit records per side. Also, each cassette tape may be recorded along each opposite edge by physically inverting the cassette upon the recorder, thereby doubling the aforementioned recording capacity.

As has been indicated, the hardwired read-out memory 38 is a component part of the invention which is of extreme significance and importance to the concept on which the invention is based. That is, not only is it important to that concept to have a read-only memory which dedicates the device to a particular operational configuration, but it is also important to embody the read-only memory in the form of a wired device, preferably as a plug-in module or series of plug-in circuit boards together comprising such a module. This is so because, while the wired ROM is unalterable by the operator, it is nonetheless an interchangeable component allowing the machine to be rededicated by changing only the wired-in program of the ROM, i.e., by changing the read-only memory module, under penalty of only modest expense when compared to the conventional approach of designing particular logic and memory capabilities for each different functional application and environment.

In the present device, the hardwired ROM stores an internal code for each key on the keyboard, as well as a display character set for each different character desired to be visually displayed on the CRT; furthermore, the ROM must store a particular and individual set of micro-instructions (data transfer logic) for machine operation satisfying a given functional configuration. Such micro-instructions are embodied in a specific multiple winding set representing the ultimate translation of a program for the desired functional configuration which was originally written in Fortran-level machine language and which has been translated into ROM winding requirements. For the typical type of application, as indicated by some of the specific examples set forth above, the ROM may be implemented from 16 individual pages of 256 eight-bit words per page, preferably with each page being embodied in a plug-in circuit board carrying E-core (for example) posts. Each of the wires in the memory may contain four words, and thus each page may include 64 wires wound, for example, about 16 paths and 16 posts. The first eight pages of the wired ROM may be dedicated to the micro-instructions for the central logic unit which establish the machine routine and dedicate the terminal to a given use, while the other eight pages may be used to store the key codes and display character set used in carrying out the micro-instructions of the first eight pages.

The ROM output may be of the same eight-bit form as the internal code entered into the data buffer delay line memory and displayed on the CRT, as mentioned previously. However, the full ROM address should be given with 12 bits, requiring an 11-bit program counter to be included in the central logic unit to address the various ROM pages and the instructions on particular pages. That is, the eight least significant bits of the 11-bit program counter will identify a particular address on a ROM page, while the three most significant bits will address a particular page of the ROM. The eight least significant bits may be stored in one of the dedicated registers, as mentioned above, while the three most significant bits may be stored in one of the dedicated latches which have been mentioned. Actually, while the full ROM address is given in 12 bits, the fourth MSB may be assumed zero in the case of an "executable" instruction, which will be confined to certain specific pages of the ROM. Otherwise, full four-bit address information may come from a different dedicated latch, by which any of the 16 ROM pages may be addressed.

As mentioned above, the video data necessary to generate 64 characters on the CRT display is also stored in the ROM. The address of such information may be a nine-bit binary signal, whose lower six bits correspond to the ASCII code involved and whose upper three bits denote the vertical element of the character to be displayed.

The central logic unit may be implemented in different specific ways, but must be capable of interpreting the micro-instruction sequences wired into the ROM and to make the various logical decisions and information transfers dictated by the micro-instructions, as well as by the format program entered into the program buffer parts of the delay line memory, either from the keyboard or from a pre-recorded tape. Thus, the central logic unit must be configured to carry out all of the eight-bit instructions from the ROM, which instructions may be divided into two basic classes according to their levels of addressing. For example, direct instructions concern the information contained in the sixteen various read/write registers of the working storage. Such instructions can be determined by the presence or absence of a constant one or zero in a particular bit location and, of the remaining seven bits, three can specify the operation while four can specify the particular register. All 16 registers can thus be addressed by these instructions, and may be assumed to contain operands. Indirect instructions can be used to address latch storage, as well as ROM locations. These instructions can be distinguished by the presence or absence of a constant one or zero in a particular bit location (preferably, the presence of a one in the same bit location where a presence of a zero will designate a direct instruction), with three of the remaining seven bits specifying the operation, one specifying whether latch storage or ROM is being addressed, and the three remaining bits specifying a register. Only the first eight of the 16 total registers in working storage are addressable by indirect instructions, and these registers may be used to carry the address of an operand located in latch storage or even in the ROM, rather than containing the operand itself.

In accordance with the foregoing, it may be seen that activation of a key on the keyboard 12 results in the presence of a particular eight-bit parallel-form signal which is coupled to a parallel latch and which is converted into serial format when read by the logic unit. The wired-in program in the ROM instructs the logic unit to sample the keyboard latch and read the eight-bit signal over parallel lines, and the ROM program will recognize or acknowledge the signal from the key if the same is of the proper form and content. If properly recognized, the ROM program will immediately direct the signal to a register which is part of the working storage. Identification of the signal will be read out of the working storage location. A storage location in the ROM will be addressed by the key code for the signal placed in the working storage, and this will produce a corresponding ASCII code for that particular key. The ROM program will determine where that ASCII code should be stored in the data buffer section of the delay line memory, and a transfer from the register to the delay line will be made. Another keyboard sampling will follow, guided by the ROM program. In this manner, the hardwired ROM program will provide complete and all-inclusive instructions for each signal entering the logic unit through the parallel latch from the keyboard, including instructions concerning the video display of characters which have been entered. That is, the CRT display controller "reads" the data buffer section of the delay line memory and obtains the ASCII codes placed in the data buffer for character display and ultimate recording. The controller for the CRT display uses the ASCII codes read from the data buffer delay line as addresses to the ROM, from which blanking codes are read for each particular character whose ASCII code has been read out of the data buffer delay line. The blanking codes from the ROM allow the CRT display to present the video display of the character, and when the record entered in the data buffer delay line is ultimately recorded on tape, it is serially recorded in the form of the ASCII codes actually stored in the delay line memory.

Because the terminal device of the invention is a buffered unit, wherein a complete data record is stored in one or the other of the delay line data memory sections before being recorded on the cassette tape, and because it is also a video terminal, there are many naturally-occurring opportunities for error detection, both by the operator and by the machine, before recording on tape is actually commenced and while the entered record is still in the delay line memory. Correction of any such errors is an extremely easy task, since the entry in the delay line need only be replaced by the correct entry. Visible display of entered data on the CRT module is a significant aid in operator-detection of errors; however, as the keyboard is operated to enter data in accordance with a predetermined format placed in the program sections of the delay line buffer memory from the keyboard or from a pre-recorded tape, format errors can be automatically detected. Furthermore, as the completed data record is recorded from the buffer memory onto the cassette tape, parity bits may be calculated during the recording and written on the tape as recording progresses. When the tape is then read, parity may be recalculated from the data read out, and compared with the original parity bits recorded. In such a "read-after-write" parity check, any non-compare of parity bits can readily be used to create a "write error" message displayed on the CRT screen.

Actual verification operation can be performed either under format program control, or else without a control program in the event that it is desired to verify a record immediately after entry and before recording. For recorded data, verification can be accomplished by reading the data records one at a time from the cassette tape into a data buffer portion of the delay line memory. The data is then re-keyed by the operator from the source document, with each re-keyed character being automatically compared with the character which is stored in the delay line at that character position. The original data entered and recorded can be revealed upon the CRT screen a character at a time, as each of the keys is depressed to re-enter the data. Any non-compare between the re-keyed characters and those in the buffer memory can readily be used to produce a "verify error" message on the CRT, as well as an audible alarm, if desired. Further, the data entry portion of the keyboard can be locked out by the occurrence of any such non-compare, thereby compelling corrective measures before further verification entries can be made. Once again, the same type of read-after-write parity check as mentioned previously can be performed as corrected records are rewritten onto the cassette tape.

Finally, the data entry terminal according to the invention provides novel record-searching capabilities on previously-recorded tapes, in that an identifier record or symbol, for example consisting of data identical in content to that of the record being searched, may be entered from the keyboard into a data buffer section of the delay line memory, with as many characters being entered as are required to make the identifier symbol unique as compared to other recorded data records. Search operation may then be initiated by successively reading out from the recorded tape the data records entered thereon. When a record is read that contains data matching the identifier which has been keyed into the terminal, the search will automatically halt, with the identified record then being transferred into the data section of the delay line and being visually displayed on the CRT screen.

It is entirely conceivable that upon examining the foregoing disclosure, those skilled in the art may devise particular embodiments of the concepts forming the basis of the invention which differ somewhat from the preferred embodiment shown and described herein, or may make various changes in the present embodiment itself. Consequently, it is to be recognized that the particular embodiment shown and described is for purposes of general illustration only and is in no way intended to illustrate all possible forms of the invention. In particular, it should be noted that the device is exceedingly useful merely as a data recorder, particularly in view of the cassette-type tape cartridges it uses, without the rigid necessity of an interconnection to a computer-compatible tape converter or a communications link to a remote general purpose computer or a central processing unit. Further, many possible embodiments intended for specific operational configurations need not incorporate the tape-recording capabilities of the device, but will be eminently useful if interconnected, by communication links or otherwise, to other like terminal devices and central memory or computer unit.

It may be observed in studying the foregoing specification that the same has not been burdened by the inclusion of large amounts of detailed and specific information relative to such matters as circuitry, memory structure, logic and timing, instruction sets, and the like, since all such information is basically well within the skill of the art as of the present date. Examples of technical publications already in existence and relating to such aspects are set forth hereinafter, with the basic technical information set forth in each incorporated herein by reference. U.S. Pat. No. 3,389,404, issued to Robert A. Koster; U.S. Pat. No. 3,406,371, issued to Amdahl et al.; Technical Memorandum ESL-TM-167, dated March 1963, by Robert H. Stotz; Technical Note by Robert H. Koster in the Sixth National Symposium on Information Display, Sept. 29, 1965; Technical Memorandum by Thomas H. Tach, Proceedings of the Thirty-Second National Symposium on Information Display, February 1964.

Inasmuch as the foregoing specification is directed toward those skilled in, and fully conversant with, the art pertaining to the subject matter of this invention, the specification has not been unduly burdened with the inclusion of unnecessary detailed descriptions of things already well known to those skilled in the art as of the filing date. To whatever extent it may be deemed desirable, however, those desiring to do so may refer further to previous patents and publications which show techniques or apparatus for the practice or implementation of different parts of the novel combination described and claimed herein, as follows. The assembling of digital devices of known types to constitute a micro-processor generally in accordance with the present invention is described in printed publications such as, for example, "Digital Computer Design Fundamentals" by Y. Chu (McGraw-Hill Book Company, 1962), "Planning a Computer System" by W. Buchholz (McGraw-Hill Book Company, 1962), and "Analog and Digital Computer Technology", by N. R. Scott (McGraw-Hill Book Company, 1960). A stored-program processor for data, and data control and visual data display functions may be generally in accordance with U.S. Pat. No. 3,389,404, which also shows data entry from a keyboard source. Keyboard data entry, as used in the present invention, may also be generally in accordance with U.S. Pat. No. 2,918,658, which also shows the use of buffer memories, and data recording on magnetic tape. U.S. Pat. No. 3,308,438 shows data display by use of a CRT which may be used in practicing the present invention and this patent also shows the use of a core memory, as well as shift registers, latches, a keyboard, and buffer memories, all of which are used in the present invention. U.S. Pat. No. 3,388,385 also shows data display by use of CRT, in conjunction with the use of a wire core memory, generally as used in practicing the present invention. U.S. Pat. No. 3,438,003 sets forth considerable technology on data display logic, and shows the use of a keyboard for data entry and a CRT display for visual readout. U.S. Pat. No. 3,439,986 shows digital storage technology, as well as control and interconnection circuitry and logic, together with a keyboard for data entry and a CRT display. U.S. Pat. No. 3,447,134 describes the use of program control logic, various memory applications, magnetic tape data recording, and the use of latches for data handling, and these aspects of the present invention may be practiced generally in accordance with such teachings. Additionally, U.S. Pat. No. 3,400,371 contains a wealth of information on data-handling techniques and apparatus, including an implementation of a read-only memory in such apparatus. Furthermore, *IBM Publication Form A*27-2702-0, dated 1966, directed toward the IBM 2250 display unit and IBM 2840 display control and of record herein, describes a keyboard-buffer-display system, which although differing in certain particulars from that in the present invention, nonetheless sets forth technology which could be used in an implementation of the present invention. Furthermore, considerable technology relative to hard-wired read-only memories, such as are used in the practice of the present invention, is available in an article entitled "The Braid Transformer Memory" by W. H. Aldrich and R. L. Alonso (IEEE Transactions on Electronic Computers, August 1966) and in an article entitled "The Rope Memory: A Permanent Storage Device", by P. Kuttner (Proceedings AFIPS, 1963, Fall Joint Computer Conference). A reference treating at some length the use of delay lines for implementing buffer memories as used in the present invention may be found in "Wire-Type Acoustic Delay Lines For Digital Storage", by G. G. Scarrott and R. Naylor (Proceedings IEE, London, Volume 103, Part B, Convention on Digital Computer Technology, April 1956). Magnetic tape data recording as used in the present invention may be accomplished generally in accordance with the article entitled "Magnetic Data Recording Theory: Head Design" by A. S. Hoagland (Trans. AM. INST. ELEC. ENGRS., Volume 75, part 1, November 1956). Regarding timing, control and display of information, refer to Technical Memorandum ESL-TM-167, by Robert H. Stotz, 1963. With respect to information display, refer to the Technical Note by Robert A. Koster in the sixth national symposium on information display, September 1965. With respect to logic unit design and implementation, refer to Proceedings of the 1967 Spring Joint Computer Conference, containing several technical papers with practical examples on numerous implementations. In particular, refer to the paper entitled "Logic Design of Macromodules" by M. J. Stucki, S. M. Ornstein and W. A. Clark.

The embodiments of the invention in which an exclusive property or privilege is claimed are defined as follows.

1. A source data entry terminal device for capturing and storing data for future processing or the like, comprising in combination: a keyboard data entry means for producing coded alphanumeric data representative of different keys upon actuation thereof; an optical display means for visual character read-out of such data; means for coupling coded data entered into said terminal to a data recorder or reproducer means; and a programmed microprocessor interfaced to each of said entry means, said display means and said coupling means; said microprocessor including a fixed-program read-only memory and a central logic unit embodying substantially all of the control logic for said entry means and display means; said read-only memory having a built-in program dedicating the terminal to a particular functional configuration and establishing an instruction set which time-shares said central logic unit with said entry means and display means to control the same in conformance with such functional configuration.

2. The data entry terminal of claim 1, wherein said read-only memory comprises a wired memory device.

3. The data entry terminal of claim 1, including a buffer memory interfaced to said microprocessor for temporary storage of said data; said microprocessor program causing storage of such data in said buffer memory upon initial production thereof by said entry means and when the data is visibly read out by said display.

4. The data entry terminal of claim 3, wherein said buffer memory comprises a delay line-type memory.

5. The data entry terminal of claim 1, wherein said data recorder or reproducer means comprises a magnetic tape recorder and said coupling means comprises means interfacing said tape recorder with said microprocessor; said central logic unit also embodying control logic for said recorder, and said read-only memory program instruction set time-sharing said central logic unit with said recorder as well as with said entry means and display means.

6. The data entry terminal of claim 5, wherein said tape recorder is of the type which records upon and replays cassette-type tape magazines comprising generally flat cartridges wholly enclosing a length of recording tape on the order of one-eighth inch wide.

7. The data entry terminal of claim 5, further including a buffer memory interfaced to said microprocessor for temporary storage of said coded data; said microprocessor program causing storage of such data in said buffer memory upon initial production thereof by said entry means and when the data is visibly read out by said display.

8. The data entry terminal of claim 7, wherein said buffer memory comprises a delay line memory.

9. The data entry terminal of claim 1, wherein said coupling means comprises a communications link for connecting the terminal to a remote data processing station, memory bank or another like terminal.

10. The data entry terminal of claim 1, wherein said microprocessor further includes means providing multiple-location working storage.

11. The data entry terminal of claim 10, wherein said last means includes a plurality of registers.

12. The data entry terminal of claim 11, wherein said logic unit includes a program counter, and wherein at least one of said registers comprises an exclusive storage element for program counter addressing.

13. The data entry terminal of claim 11, wherein at least one of said registers comprises an accumulator for logic unit instructions.

14. The data entry terminal of claim 11, wherein said logic unit includes a program counter and at least one of said registers comprises an exclusive storage element for program counter addressing, and wherein at least one of said registers comprises an accumulator for logic unit instructions.

15. The data entry terminal of claim 1, wherein said microprocessor includes a plurality of read/write latch storage locations, and wherein said keyboard data entry means is interfaced to said logic unit by one or more of said latches.

16. The data entry terminal of claim 3, wherein said microprocessor includes a plurality of read/write latch storage locations, and wherein said keyboard data entry means and said buffer memory are each interfaced to said logic unit by certain of said latches.

17. The data entry terminal of claim 16, wherein said data recorder or reproducer means comprises a magnetic tape recorder and said coupling means comprises certain of said latches interfacing said tape recorder with said microprocessor; said central logic unit also embodying control logic for said recorder, and said read-only memory program instruction set time-sharing said central logic unit with said recorder as well as with said entry means and display means.

18. The data entry terminal of claim 17, wherein said microprocessor further includes multiple-register working storage.

19. A source data entry terminal device for capturing and storing data for future processing or the like, comprising in combination: a keyboard data entry means for producing coded alphanumeric data representative of different keys upon actuation thereof; an optical display means for visual read-out of data characters entered by said keyboard means; a magnetic tape recorder/reproducer means including at least one cassette-type magnetic tape magazine, for recording data thereon entered by said keyboard and read out by said display; and control means interfaced to said data entry means, said optical display means and said recorder/reproducer means and intercoupling the same for cooperative operation such that data entered by said keyboard means is visually displayed and magnetically recorded on said cassette tape magazines.

20. The data entry terminal of claim 19, including a buffer memory and means interfacing same with said keyboard, with said display, and with said recorder means, such that data entered from said keyboard is held in the buffer memory for visual display prior to being recorded.

21. The data entry terminal of claim 20, wherein said buffer memory comprises at least one delay line memory.

22. The data entry terminal of claim 20, wherein said control means includes a fixed-program microprocessor having a read-only memory means.

23. The data entry terminal of claim 22, wherein said read-only memory comprises a wired device.

24. A method of source data capture, comprising the steps: generating coded signals representative of source data desired to be captured; and recording signals corresponding to those generated upon magnetic tape enclosed within cassette tape cartridges, of the basic type conventionally used for audio recording.

25. The method of claim 24, including the step of visually displaying the data upon initial generation of said signals by use of such signals.

26. The method of claim 25, including the step of temporarily storing a plurality of said data-representative signals prior to recording the same.

27. The method of claim 25, including the step of using a buffer memory to temporarily store the signals for the data being displayed while such data is displayed.

28. The method of claim 27, wherein said recording is done after the data has been visually displayed, and wherein the signals stored in said buffer memory are unloaded for recording.

29. A method of source data capture, comprising the steps: generating coded signals representative of alphanumeric source data desired to be captured; visually displaying the data of which said signals are representative by use of such signals; using a buffer memory to temporarily store the data being displayed; and recording the data on magnetic tape after the data has been visually displayed.

30. The method of claim 29, including the step of using a program format to generate said data-representative signals in a predetermined relative sequence, and visually displaying said data in such sequence.

31. The method of claim 30, including the step of visually displaying format indicia in predetermined positional relationship to the visually-displayed data.

32. The method of claim 30, including the step of holding said program format in a buffer memory during data entry.

33. The method of claim 32, including the step of loading said program format into said buffer memory by generating coded signals representative of characters defining said format and storing such signals in said buffer.

34. The method of claim 33, wherein said signals are generated by operation of a keyboard device.

35. The method of claim 30, wherein said format is used by recording it on magnetic tape and reproducing the recorded format prior to actual use.

36. The method of claim 35, wherein said format is recorded on magnetic tape enclosed within cassette tape cartridges, of the basic type conventionally used for audio recording.

37. The method of claim 35, wherein the format recorded on said tape is loaded into a buffer memory by replaying the tape, and the format is held in such buffer during data entry.

38. The method of claim 29, including the steps of searching for a particular recorded record on a tape containing a plurality of such recorded records by generating coded signals representative of at least the beginning data characters in such particular record, temporarily storing such generated signals for search purposes, replaying the recorded tape to reproduce the coded signal records accorded thereupon, and comparing the temporarily stored signals with the reproduced ones to find the particular record sought.

39. The method of claim 38, wherein said temporarily stored signals are stored in said buffer memory.

40. A method of implementing a source data entry terminal device, comprising the steps: connecting selected input/output peripheral components including at least a keyboard data display means to a buffer memory and to a central processor organization, and using said buffer memory for temporary storage of data entered by said keyboard means; incorporating control logic for all such peripheral components in the central processor and controlling each such component by the central processor, such that said peripheral components need have substantially no local control logic of their own; and dedicating the terminal to a given operational configuration by incorporating a fixed program in said central processor.

41. The method of claim 40, including the step of interfacing said peripheral components to said central processor by use of dedicated temporary read-write storage latches serving only that purpose.

42. The method of claim 41, including the step of interfacing said buffer memory to said central processor by using other of said latches.

43. The method of claim 40, including the steps of providing multiple-register working storage as a part of said central processor, and dedicating at least one such register for use as an accumulator which stores instructions for a logic unit forming a part of said processor.

44. The method of claim 40, including the steps of providing multiple-register working storage as a part of said central processor, and dedicating at least one such register for use in storing address information for a logic unit program counter comprising a part of said processor.

45. The method of claim 44, including the step of dedicating at least one other of said registers for use as an accumulator which stores instructions for said logic unit.

46. The method of claim 45, including the step of interfacing said peripheral components to said central processor by use of dedicated temporary read/write storage latches serving only that purpose.

* * * * *

PO-1050
(5/69)

UNITED STATES PATENT OFFICE
CERTIFICATE OF CORRECTION

Patent No. 3,760,375 Dated September 18, 1973

Inventor(s) Samuel N. Irwin; Michael R. Levine

It is certified that error appears in the above-identified patent and that said Letters Patent are hereby corrected as shown below:

Col. 2, line 11 after "as a wired" insert ---or like---;
Col. 2, line 12 after "a hardwired" insert ---or otherwise fixed---;
Col. 2, line 16 delete ---"merely"---;
Col. 2, line 17 after "hardwired" insert ---or fixed---;
Col. 2, line 19 after "of" insert ---extensively---;
Col. 2, line 27 before "operational" insert ---all or most of---;
Col. 4, line 16 after "invention" insert ---each of---;
Col. 4, line 16 before "input/output", insert ---different---;
Col. 4, line 18 before "individual" insert ---need not include their own---;
Col. 4, line 19 delete "all" add ---the basic---after "incorporate";
Col. 5, line 13, "keyboard of the" should read as ---keyboard. Of the---;
Col. 5, line 15 delete ---"and"---;
Col. 5, line 17 "other, used strictly as a data buffer section, and the cassette recorders" should read ---other and the cassette recorders, so as to be used strictly as a data buffer section---;
Col. 7, line 43 "delivers" should read ---deliver---;
Col. 7, line 48 after"previously" add ---may---;
Col. 7, line 49 "operative" should read ---conventional---;
Col. 8, line 5 "read-out" should be ---read only---;
Col. 8, line 12 delete "the" insert ---a---;
Col. 8, line 12 after "form" insert ---like that---
Col. 8, line 14 delete "the" insert ---a---;
Col. 8, line 15 after "wired" insert ---or like---;
Col. 8, line 18 after "ROM" insert ---of the form just mentioned---;
Col. 8, line 52 after "internal" insert --(i.e., character)--;
Col. 9, line 54 after "wired in" insert ---(or otherwise fixed)---;

Signed and sealed this 4th day of June 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,760,375 Dated September 18, 1973

Inventor(s) Samuel N. Irwin; Michael R. Levine

It is certified that error appears in the above-identified patent and that said Letters Patent are hereby corrected as shown below:

Column 16, line 28;
after "keyboard data" insert ---entry means and a visual data---.

Signed and sealed this 31st day of December 1974.

(SEAL)
Attest:

McCOY M. GIBSON JR.
Attesting Officer

C. MARSHALL DANN
Commissioner of Patents

USCOMM-DC 60376-P69
☆ U.S. GOVERNMENT PRINTING OFFICE : 1969 O—366-334.